Aug. 27, 1940.   J. B. POWERS ET AL   2,212,751
TOPPER
Filed April 26, 1939   2 Sheets-Sheet 1
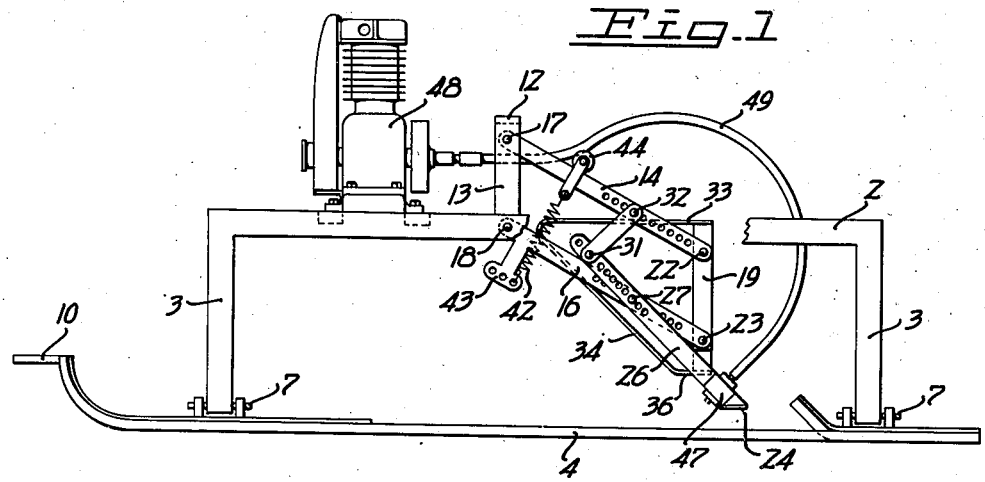
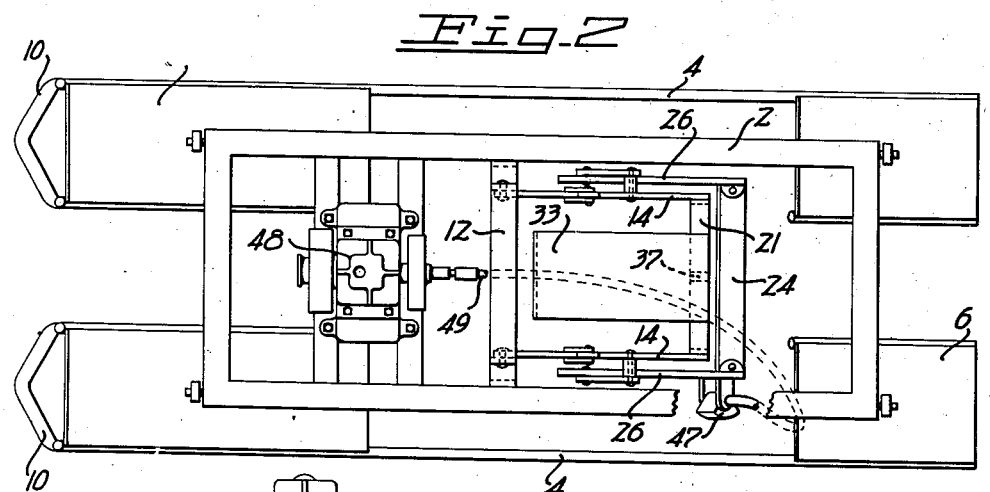
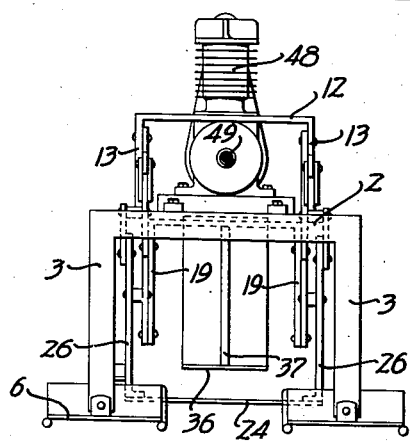
INVENTORS
JOHN B. POWERS
STANLEY W. McBIRNEY
BY
THEIR ATTORNEY

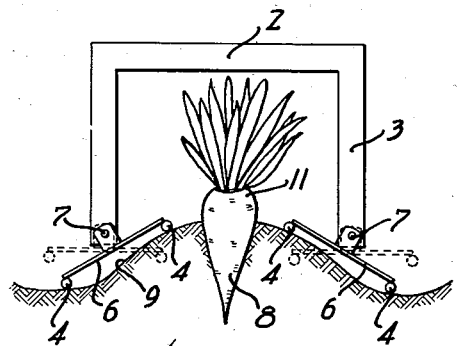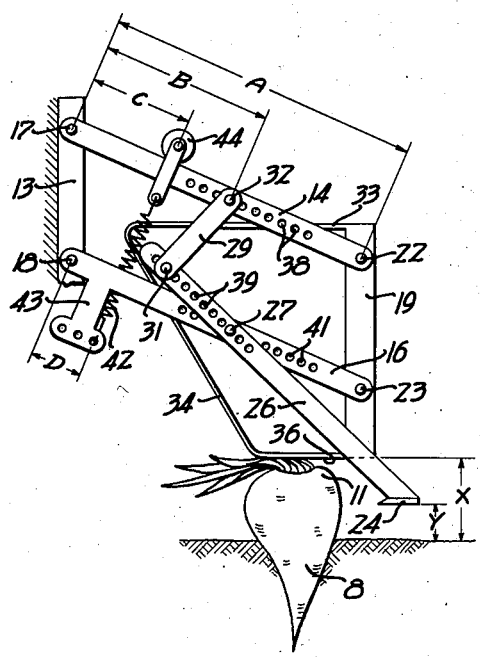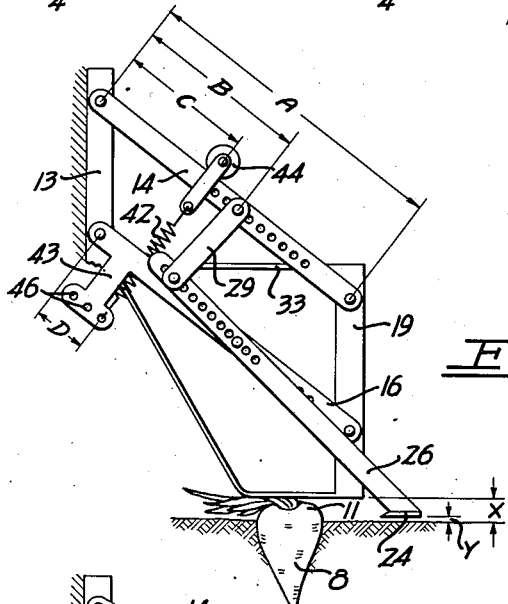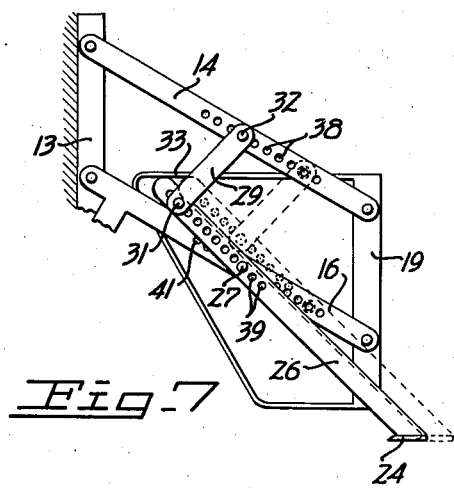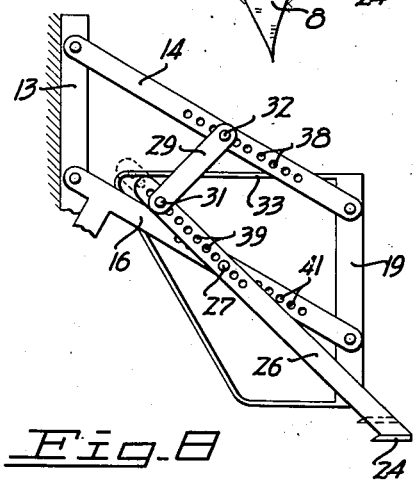

Patented Aug. 27, 1940

2,212,751

UNITED STATES PATENT OFFICE 2,212,751

TOPPER

John B. Powers and Stanley W. McBirney, Davis, Calif., assignors to United States Beet Sugar Association, Washington, D. C., a corporation of Utah Application April 26, 1939, Serial No. 270,178

9 Claims. (Cl. 55—107)

Our invention relates to a machine for topping sugar beets and similar root crops in the field preliminary to further harvest operations.

It is among the objects of our invention to provide a topper which travels along a crop row and automatically severs the crowns from the roots.

Another object is to provide a topper of the character described which removes a predetermined thickness of crown from the roots, depending upon the height of the crown above the ground.

Another object is to provide a knife for severing the crown from the root, and means responsive to the height of the crown for regulating the height of the knife above the ground to control the thickness of the severed crown.

A further object is to provide means for maintaining the ratio of the crown height to the knife height at a predetermined value.

A still further object is to provide adjusting means for changing the above mentioned ratio.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:

Figure 1 is a side elevational view of a topping machine embodying the improvements of our invention.

Figure 2 is a plan view of the topper; and

Figure 3 is a rear end elevational view of the same.

Figure 4 is a diagrammatic view illustrating the self-leveling action of the runners.

Figure 5 is a detail side view on larger scale showing the control linkage; and

Figure 6 is a similar view showing the linkage in another operative position.

Figure 7 is a side view of the control linkage to illustrate different positions of adjustment; and Figure 8 is a similar view illustrating other adjustments.

The topping of sugar beets and similar root crops has previously been done by slow, arduous hand cutting methods, because the many variable factors involved in the topping operation have retarded the development of automatic equipment for satisfactorily doing the work. In topping root crops while the roots are in the ground it is the practice to remove the foliage and certain amount of the useless root crown that projects above the ground. The amount of crown to be removed varies with each root, and the larger roots which extend further out of the ground require removal of a greater thickness of crown material than the shorter roots. In hand topping methods the workmen depend upon their experience for judging the amount of crown to be removed, but a workman's judgment is not infallible and uniform cutting without waste is difficult to obtain by these methods.

We have found that the thickness of the crown to be removed is a definite function of the height of the root crown above the ground, and that the ratio of the crown height to the knife height above the ground is a value which lies between certain limits for all ordinary conditions. On the basis of these predetermined values we have designed our machine to top the roots automatically.

In terms of broad inclusion, the topper of our invention comprises a knife for severing the crown from the root, and means responsive to the height of the root crown for regulating the height of the knife above the ground to control the thickness of the severed crown. Means are provided for maintaining the ratio of the crown height to the knife height at a predetermined value; and adjusting means are also preferably provided for changing the value of this ratio between certain limits. The mechanism is supported by a carriage movable along a crop row, and the height of the knife is regulated by a gauge shoe adapted to ride over the tops of the rots. Means are preferably provided for maintaining the carriage at a substantially constant height above the average ground level; and means are also preferably provided for vibrating the knife.

In greater detail, and referring to the drawings, our topper comprises a carriage having a rectangular frame 2 with depending legs 3 supported on sled-like runners 4. Each runner preferably comprises front and rear plate shoes 6 connected by the outer runner bars, and the runners are pivotally connected along the medial line of the shoes by pins 7 to the lower ends of frame legs 3. The pins are arranged so that the runners are free to tilt about axes extending longitudinally of the carriage.

As shown in Figure 4, the runners are spaced to permit the carriage to straddle a row of beets or other roots 8 to be topped, and when so positioned runners 4 ride in furrows 9 at each side of the row. Because of their pivot arrangement, the ground engaging runners accommodate themselves to the slope of the furrow banks and maintain the frame at a substantially constant height above the average ground level. The dotted lines in Figure 4 indicate the horizontal positions of the runners if the ground were flat, and illustrate how the lower ends of the carriage frame are maintained at the average ground level under the sloping ground conditions in the furrows. The tilted runners engaging the sides of the furrow also serve to center the frame over the row of beets.

If desired other ground engaging means may be provided for the carriage, such as wheels running in the furrows. The sled-like arrangement shown is preferred however because of its simplicity and the effectiveness of its self-leveling action. It is understood that any suitable means, such as a tractor, may be employed for pulling the carriage along a row, and bars 10 are preferably provided at the leading ends of the runners for connecting a pulling attachment with the carriage.

Means are provided on the carriage for severing the crown 11 from a beet 8 as the carriage moves along a row. As shown in Figures 1 to 3, a yoke shaped bracket 12 having vertical sides 13 is rigidly secured transversely of frame 2. A pair of parallel bars 14 and 16 are pivotally connected to each side of bracket 12 by suitable pivot pins 17 and 18, and in the operative position of the device these bars extend rearwardly and downwardly. The lower ends of each pair of bars are pivotally connected to depending sides 19 of a yoke piece 21 by pivot pins 22 and 23. By this arrangement the linkage formed by the two sets of parallel bars 14 and 16 is adapted to swing up and down within the frame of the carriage.

A horizontal knife 24 is carried at the trailing end of the linkage, and is fastened to the depending ends of a pair of inclined arms 26 pivoted intermediately to lower parallel bars 16 by pivot pins 27. The upper ends of these knife supporting arms are in turn pivotally connected to the upper parallel bars 14 by links 29 and pins 31 and 32. The knife therefore moves up and down in time with the raising and lowering of the linkage, and at all times the knife lies in a horizontal plane due to the parallel bars in the linkage. As shown in Figures 2 to 3, knife 24 extends transversely between the runners of the carriage with the cutting edge forward, whereby the knife is adapted to sever the crowns from the beets as the carriage moves along a row.

Means responsive to the height of the beet crown is provided for regulating the height of the knife above the ground to control the thickness of the severed crown. This is accomplished by a height gauge adapted to ride over the tops of the beets, and comprises a shoe 33 formed from a plate bent to provide an inclined forward face 34 and a horizontal bottom face 36. The upper rear edge of the shoe plate is fastened to the cross bar of yoke piece 21, and an upright 37 is arranged between the upper and lower edges of the shoe for additional support. Gauge shoe 33 lies between the runners of the carriage in advance of knife 24, and is thus positioned to ride over the top of a beet and lift the linkage and knife prior to the latter's engagement with the beet.

The particular arrangement of the linkage also serves the very important function of varying the thickness of the severed crown in proportion to the height of the beet crown above the ground. As already pointed out, sugar beets and similar roots have crowns projecting different distances above the ground in growing position, and it is important to remove varying thickness of the crown in different beets to eliminate the correct amount of useless beet material. Thus, in beets with high crowns it is necessary to remove more crown material than in low growing beets.

We have found that the correct thickness of crown to be removed is a function of the crown height above the ground, and that the ratio of crown height to knife height is a predetermined value greater than unity and lying between the limits of 1.4 and 1.7 for all average conditions. In our control linkage the various pivot points are set so that the ratio of the crown height X to the knife height Y is of a value greater than unity so that the difference X—Y increases as X increases, thus cutting a greater thickness of crown from a high beet than from a low one; the ratio $$\frac{X}{Y}$$

preferably having a value between the limits of 1.4 and 1.7 as above mentioned.

The ratio $$\frac{X}{Y}$$

is proportional to the ratio of lever arm lengths $$\frac{A}{B}$$

and for a given setting of the pivots as shown in Figures 5 and 6, a certain lift of height gauge 33 will result in a predetermined lift of knife 24. These figures also show that the thickness of slice X—Y is greater for high beets than for low ones.

It is also desirable to provide adjustment means in the linkage to vary the value of ratio $$\frac{X}{Y}$$

between the limits recited to accommodate the topper for different growing conditions in different fields; it being understood that in some fields it is desirable to remove a greater amount of crown material for a given height of beet than in other fields. In our linkage the ratio $$\frac{X}{Y}$$

is proportional to the ratio of the lever arm lengths $$\frac{A}{B}$$

and therefore changing the length of B serves to alter the ratio $$\frac{X}{Y}$$

We effect the adjustment by providing holes 38, 39 and 41 along bar 14, arm 26 and bar 16 for receiving pins 32, 31 and 27 respectively.

In making this adjustment, knife arm 26 and link 29 are shifted to new positions parallel to their previous setting for a given height of gauge 33, as indicated by dotted lines in Figure 7. This parallel shift of the parts maintains knife 24 in the same horizontal plane, but changes the length of lever arm B to alter the ratio $$\frac{A}{B}$$

Another desirable adjustment is to change the height of knife 24 for a given height of gauge 33 without changing the ratio $$\frac{A}{B}$$

This is accomplished by shifting arm 26 longitudinally without changing the setting of link 29, as indicated by dotted lines in Figure 8.

Means are also provided for pressing height gauge 33 and knife 24 downwardly. As shown in Figures 1, 5 and 6, a spring 42 is connected between parallel bars 14 and 16. The lower end of the spring is preferably fastened to a depending portion 43 of lower bar 16, and a roller 44 is connected with the other end of the spring to ride on upper bar 14 as a track. Such a spring is preferably provided for each pair of the parallel bars, and they operate to urge the linkage downwardly. An important feature of this arrangement is that roller 44 moves inwardly on bar 14 as the linkage rises, thereby decreasing lever arm C. In other words, the downward force on gauge 33 decreases as the gauge elevates, so that there is a lessening pressure as the gauge rides up to prevent the gauge from breaking off the higher beets.

The downward force for a given height of the gauge is proportional to the difference C—D, and therefore the depressing force may be adjusted by changing distance D. For this purpose a series of holes 46 may be provided in arm portion 43 to change the anchor point of the spring.

Means are also preferably provided for vibrating knife 24 longitudinally to facilitate cutting. For this purpose a weight 47 is preferably eccentrically journalled in the lower side of one of the knife arms 26, as shown in Figures 1 and 2. There is a certain amount of spring in arms 26, and the reaction forces from the rotating off-balance weight give a longitudinal vibrating motion to the knife. Weight 47 is preferably rotated by a suitable motor 48 mounted on frame 2 and connected to the weight by a flexible shaft 49. If desired shaft 49 may be carried forward and a power take-off made from the pulling vehicle. It is also understood that the vibrating means may be eliminated, or other actuating means such as positive pitman provided for effecting knife oscillation. It is further understood that other types of severing means, such as a rotating blade may be employed.

We claim:

1. A topper for beets and the like, comprising a linkage including a pair of pivoted parallel bars, a gauge shoe carried by the linkage and adapted to ride over the crown of a beet, an arm pivoted to one of the bars, a link pivotally connected between an end of said arm and the other bar, and a knife carried by the other end of said arm for severing the crown from the beet.

2. A topper for beets and the like, comprising a linkage including a pair of pivoted parallel bars, a gauge shoe carried by the linkage and adapted to ride over the crown of a beet, an arm pivoted to one of the bars, a link pivotally connected between an end of said arm and the other bar, a knife carried by the other end of said arm for severing the crown from the beet, and means for adjustably positioning the pivot points of said link along the arm and bar.

3. A topper for beets and the like, comprising a linkage including a pair of pivoted parallel bars, a gauge shoe carried by the linkage and adapted to ride over the crown of a beet, an arm pivoted to one of the bars, a link pivotally connected between an end of said arm and the other bar, a knife carried by the other end of said arm for severing the crown from the beet, and means for adjustably positioning the pivot point of said arm along the bar.

4. A topper for beets and the like, comprising a linkage including a pair of pivoted parallel bars, a gauge shoe carried by the linkage and adapted to ride over the crown of a beet, an arm pivoted to one of the bars, a link pivotally connected between an end of said arm and the other bar, a knife carried by the other end of said arm for severing the crown from the beet, and a spring connected between the bars.

5. A topper for beets and the like, comprising a linkage including a pair of pivoted parallel bars, a gauge shoe carried by the linkage and adapted to ride over the crown of a beet, an arm pivoted to one of the bars, a link pivotally connected between an end of said arm and the other bar, a knife carried by the other end of said arm for severing the crown from the beet, a spring connected at one end to one of the bars, and a roller connected to the other end of the spring and riding on the other bar as a track.

6. A topper for beets and the like, comprising a carriage movable along a row of beets, ground engaging runners on the carriage and mounted for free pivotal movement about axes extending longitudinally of said row so that each runner is free to assume inclined positions independently of another runner for maintaining the carriage at a substantially constant height above the average ground level, and a knife on the carriage for severing the crowns from the beets.

7. In a cutting device, a knife, a resilient arm for holding the knife, an eccentrically mounted weight supported bodily by said arm, and means for rotating the weight to vibrate the knife.

8. A topper for beets and the like, comprising a frame, a pair of parallel bars each pivoted at one end to the frame, a gauge shoe pivotally connected to the other ends of said bars, an arm pivoted to one of the bars, a link pivotally connected between an end of said arm and the other bar, and a knife carried by the other end of said arm.

9. A topper for beets and the like, comprising a frame having an element fixed thereon, a pair of parallel bars each pivoted at one end to said element, a second element parallel to said first element and pivotally connected to the other ends of the bars, a gauge shoe fixed to the second element, an arm pivoted to one of the bars, a link pivotally connected between an end of said arm and the other bar, and a knife carried by the other end of said arm.

JOHN B. POWERS.
STANLEY W. McBIRNEY.